United States Patent
Cheraga et al.

(10) Patent No.: US 12,320,314 B2
(45) Date of Patent: Jun. 3, 2025

(54) AIR INLET OF A NACELLE OF AN AIRCRAFT PROPULSION ASSEMBLY FOR PROMOTING A THRUST PHASE AND A REVERSE THRUST PHASE, AND METHOD FOR USING SAME

(71) Applicant: SAFRAN AIRCRAFT ENGINES, Paris (FR)

(72) Inventors: Yacine Cheraga, Moissy-Cramayel (FR); Daniel-Ciprian Mincu, Moissy-Cramayel (FR)

(73) Assignee: SAFRAN AIRCRAFT ENGINES, Paris (FR)

(\*) Notice: Subject to any disclaimer, the term of this patent is extended or adjusted under 35 U.S.C. 154(b) by 0 days.

(21) Appl. No.: 18/547,248

(22) PCT Filed: Feb. 24, 2022

(86) PCT No.: PCT/EP2022/054590
§ 371 (c)(1),
(2) Date: Aug. 21, 2023

(87) PCT Pub. No.: WO2022/184530
PCT Pub. Date: Sep. 9, 2022

(65) Prior Publication Data
US 2024/0125285 A1   Apr. 18, 2024

(30) Foreign Application Priority Data
Mar. 1, 2021 (FR) .................................... 2101970

(51) Int. Cl.
*B64D 27/02* (2006.01)
*F02C 7/04* (2006.01)
*F02K 1/64* (2006.01)

(52) U.S. Cl.
CPC ................ *F02K 1/64* (2013.01); *B64D 27/02* (2013.01); *F02C 7/04* (2013.01)

(58) Field of Classification Search
CPC .............. F02K 1/64; B64D 27/02; F02C 7/04
See application file for complete search history.

(56) References Cited

U.S. PATENT DOCUMENTS 10,837,361 B2 \* 11/2020 Abrari ...................... F02K 3/06
2005/0274103 A1 \* 12/2005 Prasad ................... B64D 33/02
137/15.1

(Continued)

FOREIGN PATENT DOCUMENTS

| CN | 101716995 A | 6/2010 |
| FR | 3095194 A1 | 10/2020 |
| WO | 2019/158876 A1 | 8/2019 |

OTHER PUBLICATIONS

International Search Report from Corresponding International Application No. PCT/EP2022/054590, dated Jun. 1, 2022, 2 pages.

*Primary Examiner* — Elton K Wong
*Assistant Examiner* — Theodore C Ribadeneyra
(74) *Attorney, Agent, or Firm* — RANKIN, HILL & CLARK LLP

(57) ABSTRACT

An air inlet of a nacelle of an aircraft propulsion assembly assembly comprising an inner wall and an outer wall which are connected upstream by an air inlet lip. The air inlet lip comprising thick portions and thin portions distributed alternately over the circumference of the air inlet lip. Each thick portion comprising an upstream leading edge to separate an upstream air flow into an outer air flow guided by the outer wall and an inner air flow guided by the inner wall during a thrust phase. Each thin portion comprising a downstream leading edge situated longitudinally downstream of each (Continued)

upstream leading edge so as to detach a reverse air flow at the air inlet lip during a thrust reversal phase.

20 Claims, 6 Drawing Sheets

(56) References Cited

U.S. PATENT DOCUMENTS

| | | | |
|---|---|---|---|
| 2015/0360790 A1* | 12/2015 | Rouyre | B64C 7/02 |
| | | | 244/53 B |
| 2017/0175627 A1 | 6/2017 | Wood et al. | |
| 2018/0135557 A1* | 5/2018 | Pouyau | F02K 3/06 |
| 2020/0102067 A1* | 4/2020 | Qin | B64D 33/02 |
| 2021/0394917 A1* | 12/2021 | Klovdahl | B64D 33/02 |
| 2022/0170417 A1* | 6/2022 | Mincu | F02K 1/64 |
| 2022/0186682 A1 | 6/2022 | Mincu et al. | |

\* cited by examiner

AIR INLET OF A NACELLE OF AN AIRCRAFT PROPULSION ASSEMBLY FOR PROMOTING A THRUST PHASE AND A REVERSE THRUST PHASE, AND METHOD FOR USING SAME

TECHNICAL FIELD

The present invention relates to the field of aircraft propulsion assemblies and more particularly a nacelle air inlet for an aircraft propulsion assembly.

In a known manner, in reference to FIG. 1A, an aircraft propulsion assembly 800 extends along a longitudinal axis X oriented from upstream to downstream and comprises a turbine engine 700 and a nacelle 200. The turbine engine 700 extends along the longitudinal axis X and is configured to allow propulsion of the aircraft from the acceleration of an inner air flow F-INT circulating from upstream to downstream in the turbine engine 700. The nacelle 200, on the other hand, extends outwardly around the turbine engine 700 along the longitudinal axis X and makes it possible to guide the inner air flow F-INT in the turbine engine 700. Subsequently, the terms "upstream" and "downstream" are defined with respect to the orientation of the longitudinal axis X. The terms "inner" and "outer" in turn are defined along the radial direction with respect to the longitudinal axis X.

In a known manner, as shown in FIG. 1A, the turbine engine 700 is a bypass turbine engine and comprises upstream a fan 300 rotatably mounted about the longitudinal axis X to accelerate the inner air flow F-INT from upstream to downstream. The turbine engine 700 also comprises, downstream of the fan 300, a primary flow path 400, radially inner, and a secondary flow path 500, radially outer, which are separated by a casing 600. The casing 600 is configured to guide a first portion of the inner air flow F-INT, called primary air flow F1, into the primary flow path 400 for fuel combustion and a second portion of the inner air flow F-INT, called secondary air flow F2, into the secondary flow path 500 so as to generate the thrust of the turbine engine 700.

In a known manner, still in reference to FIG. 1A, the nacelle 200 extends radially outwards to the fan 300 and radially outwardly delimits the secondary flow path 500. The nacelle 200 comprises at its upstream end an air inlet 100 extending peripherally around the longitudinal axis X. The air inlet 100 comprises an inner wall 110 turned towards the longitudinal axis X and an outer wall 120 opposite the inner wall 110, connected together upstream by an air inlet lip 130. As shown in FIG. 1A, the air inlet lip 130 has as a radial cross-section an aerodynamic rounded profile that makes it possible to separate an upstream air flow F into the inner air flow F-INT guided by the inner wall 110 and an outer air flow F-EXT guided by the outer wall 120. The air inlet lip comprises a leading edge 140, defined in each radial cross-section by the point of the air inlet lip 130 located furthest upstream, all the points forming a closed curve around the longitudinal axis X.

In reference to FIG. 1B, to reduce the braking distance of an aircraft, especially during landing, it is known to modify the orientation of the air flow in the secondary flow path 500 so as to perform a reverse thrust phase B. In what follows, a thrust phase A (FIG. 1A) is distinguished wherein the secondary air flow F2 circulates from upstream to downstream in the secondary flow path 500 and a reverse thrust phase B (FIG. 1B) wherein a reverse air flow F-INV circulates from downstream to upstream. It is specified that during a reverse thrust phase B, an inner air flow F-INT from the upstream air flow F circulates from upstream to downstream at the root of the fan 300 to supply the primary air flow F1 as well as in thrust phase A. The primary air flow F1 may also be supplied by a portion of the reverse air flow F-INV which bypasses the casing 600.

To carry out the reverse thrust phase, it is known to at least partially obstruct the secondary flow path 500, downstream of the fan 300, and to jointly uncover the grids housed in the nacelle 200 so as to form the reverse air flow F-INV oriented inversely to the secondary air flow F2. However, such a thrust reverse system has the disadvantage of increasing the mass of the aircraft propulsion assembly 800, in particular for a large-diameter nacelle 200 used in high dilution rate aircraft propulsion assemblies, namely of which the ratio of the mass of the secondary air flow F2 to the mass of the primary air flow F1 is greater than 16.

In reference to FIG. 1B, for high dilution rate aircraft propulsion assemblies, it is known to provide a variable-pitch fan 300, known by its abbreviation "VPF", which comprises blades the pitch angle of which is controlled so as to reverse the direction of circulation of the air flow in the secondary flow path 500. In practice, during a reverse thrust phase B, the reverse air flow F-INV circulates from downstream to upstream in the secondary flow path 500 and then passes through the fan 300 and is guided upstream by the inner wall 110 of the air inlet 100. The reverse air flow F-INV then opposes the upstream air flow F, particularly radially outwards in the vicinity of the nacelle 200, which allows braking. The reverse air flow F-INV then joins the outer air flow F-EXT which is admitted through the downstream end of the nacelle 200 into the secondary flow path 500.

In fact, it is observed that the reverse air flow F-INV remains attached to the air inlet 100 when it joins the outer air flow F-EXT, i.e. it follows the contour of the air inlet 100 without detaching from the inner 110 and outer 120 walls, such a phenomenon being known as the "Coanda effect". Such a phenomenon tends to accelerate the reverse air flow F-INV at the air inlet 100, which generates a local depression DP causing a force opposing the thrust reversal. Such a phenomenon may reduce the performance of the turbine engine 700 in reverse thrust phase, which is undesirable.

To increase the performance of the turbine engine 700 during a reverse thrust phase, it is known through patent applications FR1904087A1 and FR1904094A1 to mount in a mobile manner deflection devices and rectifier blades respectively on the air inlet 100, which are deployed during a reverse thrust phase B and retracted during a thrust phase A. Patent applications FR1904089A1 and FR1904096A1 alternately teach to make a portion of the air inlet 100 mobile or elastically deformable during the reverse thrust phase B. Patent application FR1904092A1 in turn teaches to form internal ducts in the air inlet that are opened during a reverse thrust phase B to divert a portion of the reverse air flow F-INV. All these solutions advantageously make it possible to modify the rounded profile of the air inlet only during a reverse thrust phase B to prevent the formation of a local depression DP, without reducing performance in the thrust phase A. However, such solutions have the disadvantage of requiring a dual-profile architecture air inlet that is complex, costly and that requires actuation, which makes it subject to possible failure.

Incidentally, a nozzle and a nacelle air outlet are known in patent application US20190128214A1 comprising chevrons allowing local generation of air swirls to promote intake at the air outlet during a reverse thrust phase. Such an air outlet and such a nozzle do not make it possible to act on the Coanda effect at the air inlet.

The invention thus aims to propose a nacelle air inlet of an aircraft propulsion assembly making it possible to promote the performance of the turbine engine both during a thrust phase and a reverse thrust phase and having a simple and robust architecture.

SUMMARY

The invention relates to a nacelle air inlet for an aircraft propulsion assembly, said aircraft propulsion assembly extending along a longitudinal axis oriented from upstream to downstream and comprising a turbine engine comprising a radially inner primary flow path and a radially outer secondary flow path configured to guide respectively from upstream to downstream a primary air flow and a secondary air flow during a thrust phase, said turbine engine comprising upstream a fan mounted rotatably about the longitudinal axis, said aircraft propulsion assembly comprising thrust reverse means configured to modify the secondary air flow into a reverse air flow circulating from downstream to upstream in the secondary flow path during a reverse thrust phase, said nacelle extending outwardly around the turbine engine and comprising at its upstream end the air inlet, said air inlet extending peripherally around the longitudinal axis and comprising an inner wall turned towards the longitudinal axis and an outer wall opposite the inner wall which are connected upstream by an air inlet lip.

The invention is remarkable in that:
- the air inlet lip comprises a thickness defined radially with respect to the longitudinal axis and comprises a plurality of thick portions and a plurality of thin portions distributed alternately over the circumference of the air inlet lip,
- each thick portion comprises an upstream leading edge configured to separate an upstream air flow circulating from upstream to downstream into an outer air flow guided by the outer wall and an inner air flow guided by the inner wall, so as to promote a thrust phase,
- each thin portion comprises a downstream leading edge, located longitudinally downstream of each upstream leading edge, configured to detach the reverse air flow at the air inlet lip, so as to promote a reverse thrust phase.

Thanks to the invention, the air inlet comprises a fixed structure with two different profiles, which allows the air inlet to promote performance both during a thrust phase and during a reverse thrust phase with a simple, convenient and economical solution. More precisely, the air inlet comprises a thick profile located upstream, which is first met by the upstream air flow circulating from upstream to downstream, as well as a thin profile located downstream, which is first met by the reverse air flow circulating from downstream to upstream. The thick profile facilitates the separation of the upstream air flow into an inner air flow and an outer air flow circulating inside and outside the nacelle respectively, and therefore promotes intake during a thrust phase. The thin profile promotes the detaching of the reverse air flow from the air inlet lip to prevent the Coanda effect from appearing, thus increasing performance during a thrust reversal. The thick portions together forming the thick profile are advantageously distributed over the entire circumference of the air inlet lip to act globally on the upstream air flow. Similarly, the thin portions together forming the thin profile are advantageously distributed over the entire circumference of the air inlet lip to act globally on the reverse air flow. A non-moving architecture air inlet lip advantageously has a longer service life and simplifies maintenance.

According to one aspect of the invention, the air inlet lip comprises a plurality of junction portions extending between each thick portion and each thin portion, each junction portion comprising a junction leading edge, so as to detach the reverse air flow in gyration, so as to promote a reverse thrust phase. Preferably, each junction portion extends longitudinally between the adjacent upstream leading edge and downstream leading edge. Such junction portions advantageously make it possible to provide the continuity between the thick portions and the thin portions, which makes it possible to preserve the aerodynamics of the air inlet. Such junction portions also provide, in addition to the thin portions, detaching of the reverse air flow, especially when it is in gyration.

According to one aspect of the invention, each junction leading edge extends, in projection in a plane tangential to the air inlet lip, along a detachment axis forming with the longitudinal axis an angle between 35° and 70°. In practice, the reverse air flow comprises a gyration generated when it passes through the fan and thus flows in a direction that forms an angle between 30° and 45° with respect to the longitudinal axis. Advantageously, the detachment axis thus forms an angle between 80° and 100° with respect to the flow direction of the reverse air flow. The reverse air flow preferably arrives substantially perpendicularly to the junction leading edge.

According to one aspect of the invention, the air inlet lip comprises a wavy leading edge, preferably comprising a plurality of chevrons. The leading edge, defined by the assembly of the upstream leading edges, joining leading edges and downstream leading edges, thus has an aerodynamic geometric shape and having two longitudinally separated profiles.

According to a preferred aspect of the invention, the upstream leading edge of each thick portion comprises a curved shape. According to a preferred aspect of the invention, the downstream leading edge of each thin portion comprises a curved shape. This makes it possible to promote aerodynamics and to have a more deployed shape for a more global action on the air flow.

According to one aspect of the invention, the upstream leading edge of each thick portion comprises a convex profile extending circumferentially with respect to the longitudinal axis and the convexity of which is facing upstream. According to one aspect of the invention, the downstream leading edge of each thin portion comprises a concave profile extending circumferentially with respect to the longitudinal axis and the concavity of which is facing upstream. In other words, each thick portion points upstream and each thin portion points downstream. Preferably, the upstream leading edge of each thick portion comprises a convex profile opposite the concave profile of the downstream leading edge of each thin portion. This makes it possible to provide a substantially even distribution of the upstream leading edge with respect to the downstream leading edge.

Preferably, the upstream leading edges each comprising an upstream point, all the upstream points are aligned transversely with respect to the longitudinal axis, and preferably, belong to an upstream circle of which the longitudinal axis passes through the center. Preferably, the downstream leading edges each comprising an upstream point, all the upstream points are aligned transversely with respect to the longitudinal axis, and preferably, belong to a downstream circle of which the longitudinal axis passes through the center. This allows the upstream leading edges to act together on the upstream air flow and the downstream leading edges to act together on the reverse air flow for greater efficiency.

According to one aspect of the invention, the air inlet lip comprises a casing:
defined, in each radial plane of a thick portion, by a radius of curvature (R) at the upstream leading edge,
defined, in each radial plane of a thin portion, by a radius of curvature (r) at the downstream leading edge,
radii of curvature verifying the following relationship: $R>1.5*r$, and preferably: $R<3*r$.

Preferably, the radii of curvature verify the following relationship: $1.8*r<R<2.2*r$. This makes it possible to have a sufficiently thick leading edge and a sufficiently thin leading edge, while limiting the mass and providing the robustness of the air inlet. The junction portions also comprise an aerodynamic shape that provides the gradual transition between the two profiles.

Preferably, each junction portion is defined in a radial plane by a radius of curvature R* at the junction leading edge that verifies the following relationship: $r<R*<R$.

According to one aspect of the invention, in at least one transverse plane located downstream of the downstream leading edges, each thick portion comprises a radial thickness greater than a radial thickness of each thin portion. This makes it possible to guide the inner air flow downstream of the upstream leading edges during a thrust phase. The thick portions advantageously delimit inside the nacelle preferential circulation corridors for the inner air flow while the thin portions delimit preferential circulation corridors for the reverse air flow.

Preferably, each thick portion extends protruding towards the inside of the air inlet, so as not to modify the outer shape of the air inlet lip and maintain its aerodynamics.

The invention also relates to the assembly of an air inlet as described previously and a fan, preferably forming the thrust reverse means. A fan with variable-pitch blades is advantageously suited for high-dilution aircraft propulsion assemblies, namely where the ratio of the mass of the secondary air flow to the mass of the primary air flow is greater than 16.

The invention also relates to a nacelle for an aircraft propulsion assembly, said aircraft propulsion assembly extending along a longitudinal axis oriented from upstream to downstream and comprising a turbine engine comprising a radially inner primary flow path and a radially outer secondary flow path configured to guide respectively a primary air flow and a secondary air flow during a thrust phase from upstream to downstream, said turbine engine comprising upstream a fan rotatably mounted about the longitudinal axis, said aircraft propulsion assembly comprising thrust reverse means configured to modify the secondary air flow into a reverse air flow circulating from downstream to upstream in the secondary flow path during a reverse thrust phase, said nacelle extending outwardly around the turbine engine and comprising at its upstream end an air inlet as described previously.

The invention also relates to an aircraft propulsion assembly extending along a longitudinal axis oriented from upstream to downstream and comprising a turbine engine comprising a radially inner primary flow path and a radially outer secondary flow path configured to guide respectively a primary air flow and a secondary air flow during a thrust phase from upstream to downstream, said turbine engine comprising upstream a fan rotatably mounted about the longitudinal axis, said aircraft propulsion assembly comprising thrust reverse means configured to modify the secondary air flow into a reverse air flow circulating from downstream to upstream in the secondary flow path during a reverse thrust phase, said aircraft propulsion assembly comprising a nacelle extending outwardly around the turbine engine and comprising at its upstream end an air inlet as described previously, the fan forming preferably the thrust reverse means.

The invention further relates to a method of using a nacelle air inlet of an aircraft propulsion assembly as described previously, wherein:
during a thrust phase, each thick portion of the air inlet lip separates an upstream air flow circulating from upstream to downstream into an outer air flow guided by the outer wall and an inner air flow guided by the inner wall, and
during a reverse thrust phase, each thin portion of the air inlet lip detaches a reverse air flow circulating from downstream to upstream at the air inlet lip.

Advantageously, such a method is advantageously free of any step of moving and/or deforming the air inlet, the latter maintaining its shape during a reverse thrust phase, which gives it a simple, robust, durable and economical architecture. The method is also quick and easy to implement, with no latency to switch from one phase to the other.

The invention further relates to a method of using an aircraft propulsion assembly such as described previously, wherein:
during a thrust phase, each thick portion of the air inlet lip separates an upstream air flow circulating from upstream to downstream into an outer air flow guided by the outer wall and an inner air flow guided by the inner wall, and
during a reverse thrust phase, the thrust reverse means are activated and each thin portion of the air inlet lip detaches a reverse air flow circulating from downstream to upstream at the air inlet lip.

Preferably, during a reverse thrust phase, the pitch of the fan blades is modified to form the reverse air flow.

DESCRIPTION OF THE DRAWINGS

The invention will be better understood upon reading the following description, given as an example, and in reference to the following figures, given as non-limiting examples, wherein identical references are given to similar objects.

Note that the figures set out the invention in detail so as to implement the invention, said figures may of course be used to better define the invention where applicable.

DETAILED DESCRIPTION

Figure 1A:
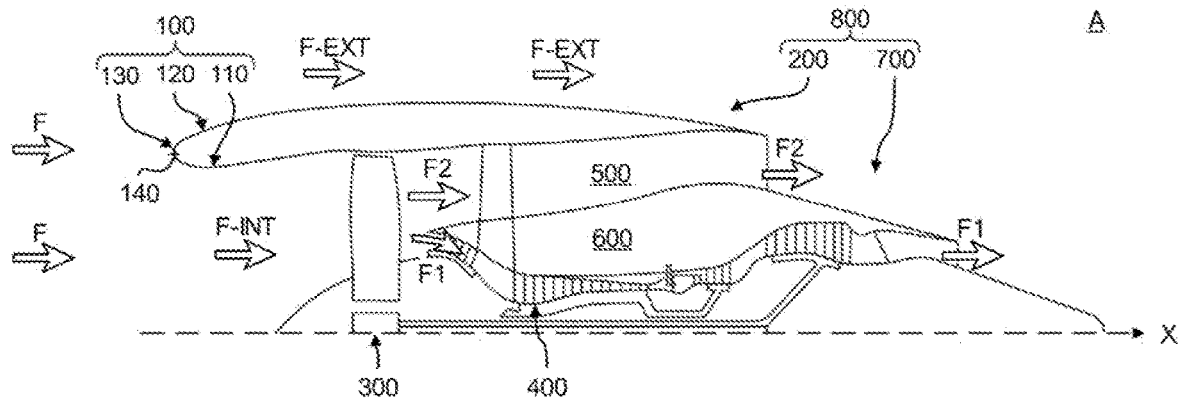
FIG. 1A is a longitudinal half-sectional schematic representation of an aircraft propulsion assembly during a thrust phase according to the prior art.
Figure 1B:
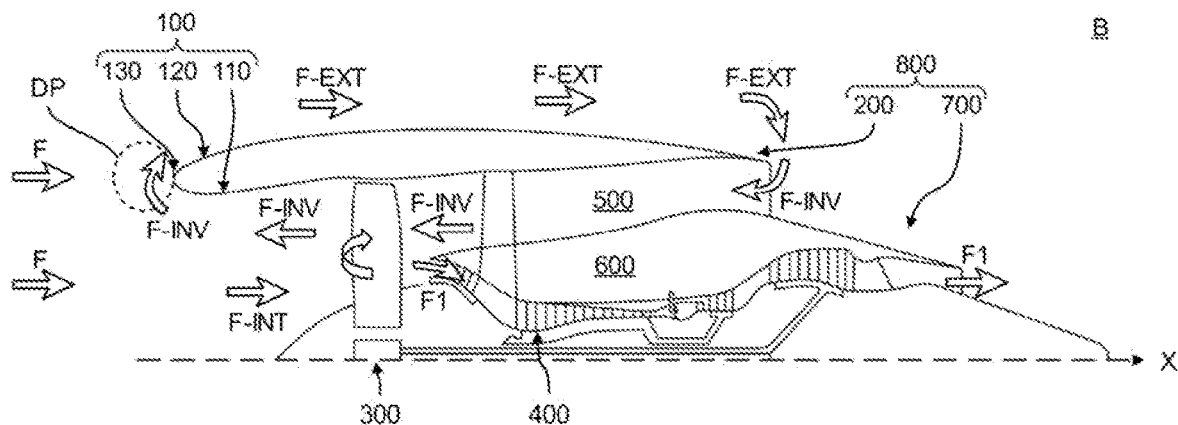
FIG. 1B is a longitudinal half-sectional schematic representation of the aircraft propulsion assembly of FIG. 1A during a reverse thrust phase.
Figure 2A:
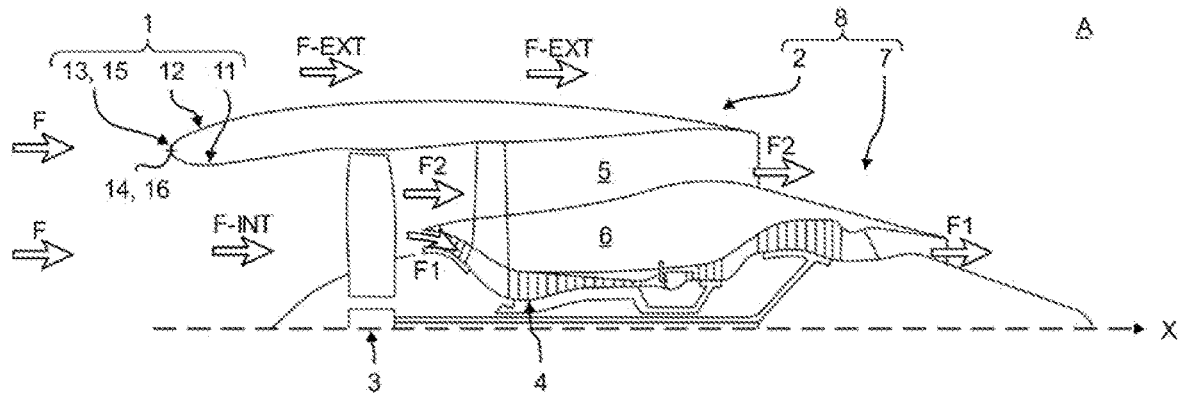
FIG. 2A is a longitudinal half-sectional schematic representation of an aircraft propulsion assembly during a thrust phase according to one embodiment of the invention.
Figure 2B:
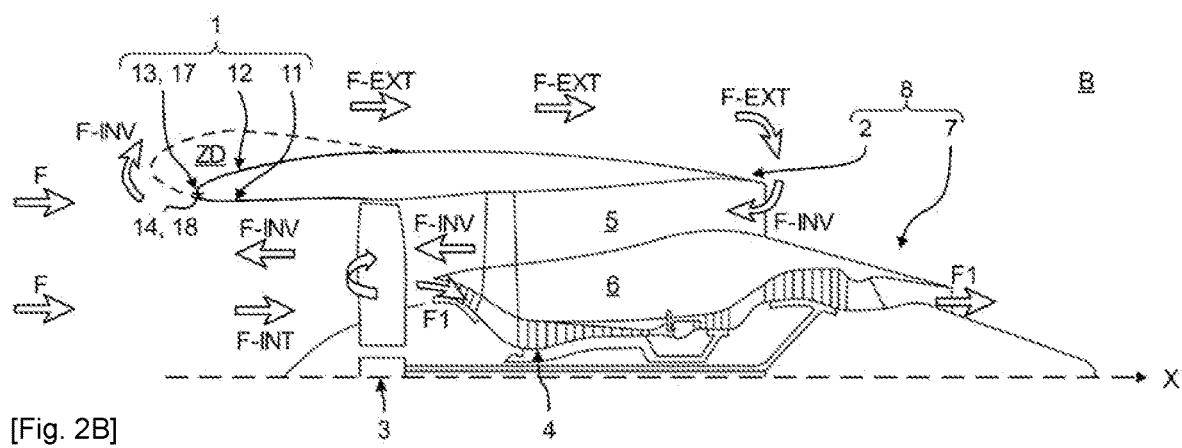
FIG. 2B is a longitudinal half-sectional schematic representation of the aircraft propulsion assembly of FIG. 2A during a reverse thrust phase.

In reference to FIGS. 2A and 2B, the invention relates to an aircraft propulsion assembly 8 with an innovative aerodynamic profile, in particular at air inlet 1, to promote performance both during a thrust phase A and during a reverse thrust phase B.

As shown in FIG. 2A and described in the preamble, the aircraft propulsion assembly 8 extends along a longitudinal axis X oriented from upstream to downstream and comprises a turbine engine 7 and a nacelle 2. The turbine engine 7 extends along the longitudinal axis X and is configured to allow propulsion of the aircraft from the acceleration of an inner air flow F-INT circulating from upstream to downstream in the turbine engine 7. The nacelle 2 extends outwardly around the turbine engine 7 along the longitudinal axis X and makes it possible to guide the inner air flow F-INT in the turbine engine 7. Subsequently, the terms "upstream" and "downstream" are defined with respect to the orientation of the longitudinal axis X. The terms "inner" and "outer" in turn are defined along the radial direction with respect to the longitudinal axis X.

As shown in FIG. 2A and described in the preamble, the turbine engine 7 is of the bypass type and comprises upstream a fan 3 rotatably mounted about the longitudinal axis X to accelerate the inner air flow F-INT from upstream to downstream. The turbine engine 7 also comprises, downstream of the fan 3, a primary flow path 4, radially inner, and a secondary flow path 5, radially outer, which are separated by a casing 6. The casing 6 is configured to guide a first portion of the inner air flow F-INT, called primary air flow F1, into the primary flow path 4 for fuel combustion and a second portion of the inner air flow F-INT, called secondary air flow F2, into the secondary flow path 5 so as to generate the thrust of the turbine engine 7.

Still in reference to FIG. 2A and as described in the preamble, the nacelle 2 extends radially outwards to the fan 3 and radially outwardly delimits the secondary flow path 5. At its upstream end, the nacelle 2 comprises an air inlet 1 extending peripherally around the longitudinal axis X. The air inlet 1 comprises an inner wall 11 turned towards the longitudinal axis X and an outer wall 12 opposite the inner wall 11, connected together upstream by an air inlet lip 13. As shown in FIG. 2A, the air inlet 13 makes it possible to separate an upstream air flow F into the inner air flow F-INT guided by the inner wall 11 and an outer air flow F-EXT guided by the outer wall 12. The air inlet lip 13 comprises a leading edge 14, defined in each radial cross-section by the point of the air inlet lip 13 located furthest upstream, all the points forming a closed curve around the longitudinal axis X.

In reference to FIG. 2B and as described in the preamble, the fan 3 is of the variable pitch type, known under its abbreviation "VPF", i.e. it comprises blades the pitch angle of which is controlled so as to reverse the direction of circulation of the air flow in the secondary flow path 5. In what follows, a thrust phase A (FIG. 2A) is distinguished wherein the secondary air flow F2 circulates from upstream to downstream in the secondary flow path 5 and a reverse thrust phase B (FIG. 2B) wherein a reverse air flow F-INV circulates from downstream to upstream to reduce the braking distance of an aircraft, in particular during landing. In practice, during a reverse thrust phase B, the reverse air flow F-INV circulates from downstream to upstream in the secondary flow path 5 and then passes through the fan 3 and is guided upstream by the inner wall 11 of the air inlet 1. The reverse air flow F-INV then opposes the upstream air flow F, particularly radially outwardly in the vicinity of the nacelle 2, which allows braking. The reverse air flow F-INV then joins the outer air flow F-EXT which is admitted through the downstream end of the nacelle 2 into the secondary flow path 5. It is specified that during a reverse thrust phase B, an inner air flow of F-INT from the upstream air flow F flows from upstream to downstream at the root of the fan 3 to supply the primary air flow F1 as well as in thrust phase A. The primary air flow F1 may also be supplied by a portion of the reverse air flow F-INV which bypasses the casing 6.

Other thrust reverse means could be used as an alternative to the variable-pitch fan 3. In particular, it could be provided to at least partially obstruct the secondary flow path 5 downstream of the fan 3, and to jointly uncover grids housed in the nacelle 2 so as to form the reverse air flow F-INV. A grid or flap reverser could in particular be used. A variable-pitch fan 3 is particularly suitable for high dilution aircraft propulsion assemblies 8, i.e. of which the ratio of the mass of the secondary air flow F2 to the mass of the primary air flow F1 is greater than 16, as it makes it possible to optimize the on-board mass.

Figure 3:
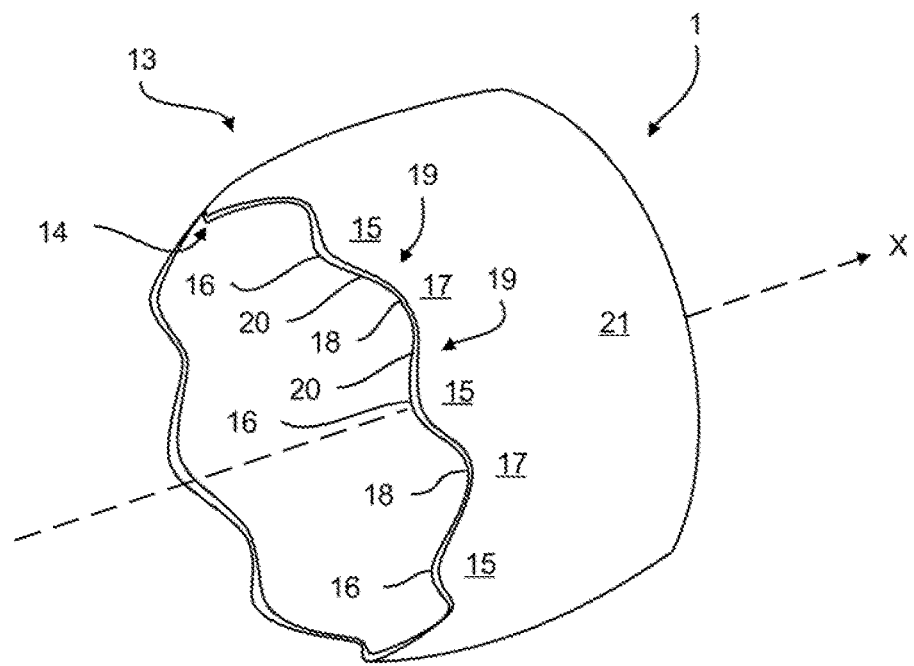
FIG. 3 is a schematic perspective representation of the air inlet of the aircraft propulsion assembly of FIG. 2A and FIG. 2B.

To promote the performance of the aircraft propulsion assembly 8 both in the thrust phase A and the reverse thrust phase B, according to the invention and in reference to FIGS. 2A, 2B and 3, the air inlet lip 13 comprises thick portions 15 and thin portions 17 distributed alternately over the circumference of the air inlet lip 13. It is specified that the air inlet lip 13 comprises a thickness which is defined here and subsequently radially with respect to the longitudinal axis X.

Still according to the invention and in reference to FIGS. 2A and 3, each thick portion 15 comprises an upstream leading edge 16 configured to separate the upstream air flow F into the outer air flow F-EXT guided by the outer wall 12 and the inner air flow F-INT guided by the inner wall 11, so as to promote a thrust phase A. In reference to FIGS. 2B and 3, each thin portion 17 comprises a downstream leading edge 18, located longitudinally downstream of each upstream leading edge 16, configured to generate a detachment zone ZD of the reverse air flow F-INV at the air inlet lip 13, so as to promote a reverse thrust phase B.

Preferably, as shown in FIG. 3, the air inlet lip 13 also comprises junction portions 19 extending between each thick portion 15 and each thin portion 17. Each junction portion 19 comprises a junction leading edge 20 configured to detach the reverse air flow F-INV in a manner complementary to the thin portions 17, so as to promote a reverse thrust phase B.

Still in the example in FIG. 3, the air inlet lip 13 comprises a fixed structure, free of moving and/or deformable parts, which is suitable for both the thrust phase A and the reverse thrust phase B. More specifically, the air inlet lip 13 comprises an upstream profile and a downstream profile configured to promote performance respectively during a thrust phase A and during a reverse thrust phase B. The upstream air flow F first meets the upstream profile, namely the thick portions 15, while the reverse air flow F-INV first meets the downstream profile, namely the thin portions 17. The upstream air flow F and the reverse air flow F-INV are thus advantageously mostly guided by the thick portions 15 and the thin portions 17 respectively.

As shown in FIG. 3, the thick 15, thin 17 and junction 19 portions are arranged as follows: a thick portion 15, a junction portion 19, a thin portion 17, and a junction portion 19 together form an elementary pattern that repeats over the entire circumference of the air inlet 1, in this example eight times. The number of thick portions 15 and thin portions 17 is equal to promote the thrust phase A and reverse thrust phase B equally. The number of junction portions 19 is twice that of thick portions 15, and therefore of thin portions 17. Preferably, by noting n as the number of thick portions 15 and N the number of blades of fan 3, the number n of thick portions 15 verifies the following relationship, for acoustic reasons: $0.5*N<n<2*N$, where $n \neq N$. In the example of FIG. 3, the number n of thick portions 15 is equal to eight.

Figure 4:
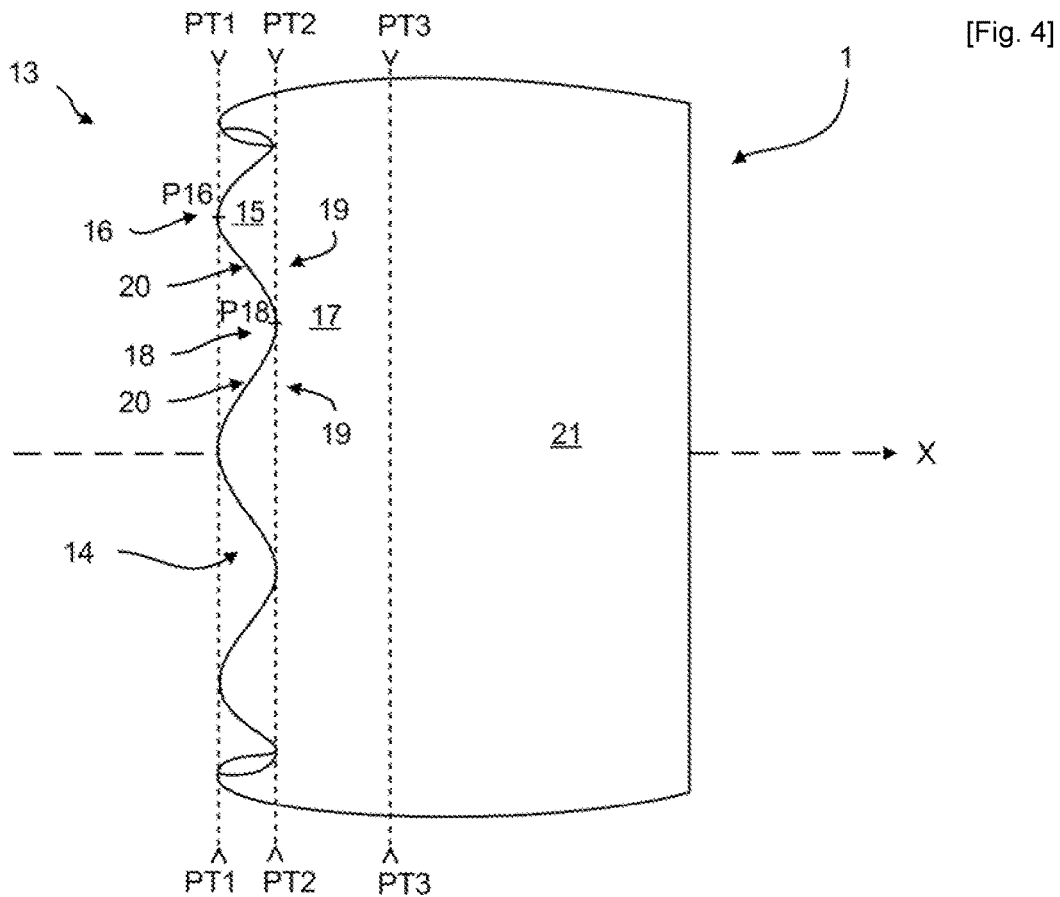
FIG. 4 is a longitudinal view schematic representation of the air inlet of FIG. 3.

In the example in FIG. 4, all the thick portions 15 comprise an identical shape and size to promote the intake of the inner air flow F-INT homogeneously over the entire circumference of the air inlet 1. Similarly, all the thin portions 17 comprise an identical shape and size to promote the detachment of the reverse air flow F-INV homogeneously over the entire circumference of the air inlet 1. Still in this example, the thick portions 15 and the thin portions 17 extend over an equal circumferential length to promote both the thrust phase A and the reverse thrust phase B. It goes without saying that at least a portion of the thick portions 15 and/or the thin portions 17 could comprise a different shape and/or size.

In reference to FIG. 4, the upstream leading edge 16 of each thick portion 15 comprises a convex shaped curved profile the convexity of which is oriented upstream. The downstream leading edge 18 of each thin portion 17, on the other hand, comprises a concave shaped curved profile the concavity of which is oriented upstream. It is specified that the upstream leading edge 16 of a thick portion 15 is defined in each radial cross-section of said thick portion 15 by the point of the air inlet lip 13 located furthest upstream. Likewise, the downstream leading edge 18 of a thin portion 17 is defined in each radial cross-section of said thin portion 17 by the point of the air inlet lip 13 located furthest upstream. Such a curved shape of the upstream 16 and downstream 18 leading edges promotes aerodynamics and facilitates their junction to obtain a simple and continuous shaped inlet lip 13. Preferably, the upstream leading edges 16 comprise a profile opposite that of the downstream leading edges 18 along an axis of transverse symmetry to the longitudinal axis X.

Figure 5:
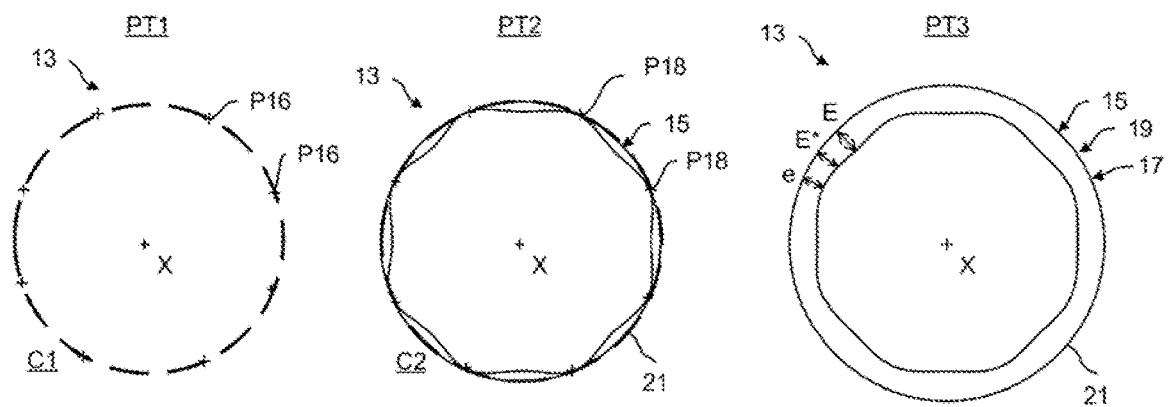
FIG. 5 is a schematic representation according to the three cross-sections of the air inlet of FIG. 3.

As shown in FIGS. 4 and 5, each upstream leading edge 16 comprises an upstream point P16, defined as the upstream leading edge point 16 located furthest upstream. In the example of FIGS. 4 and 5, the upstream points P16 of the upstream leading edges 16 are aligned in a transverse plane PT1 with respect to the longitudinal axis X, and preferably, belong to the same circle C1 in the transverse plane PT1 and center passed through by the longitudinal axis X (FIG. 5). Similarly, each downstream leading edge 18 comprises an upstream point P18, defined as the downstream leading edge point 18 located furthest upstream. In the example of FIGS. 4 and 5, the upstream points P18 of the downstream leading edges 18 are aligned in a transverse plane PT2 located downstream of the transverse plane PT1, and preferably, belong to the same circle C2 in the transverse plane PT2 and center passed through by the longitudinal axis X (FIG. 5). Such an alignment allows for a more homogeneous and global guidance of the upstream air flow F in thrust phase A and the reverse air flow F-INV in the reverse thrust phase B.

Figure 6:
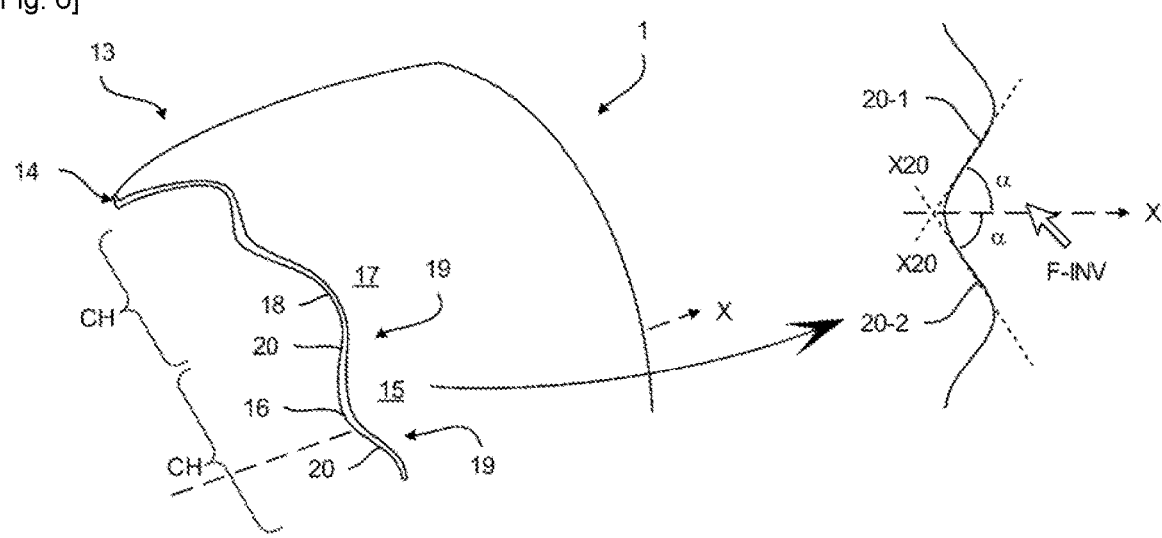
FIG. 6 is a schematic representation in a close perspective view of the air inlet of FIG. 3.

In reference to FIG. 6 and as described previously, each junction portion 19 connects a thick portion 15 and a thin portion 17 and each junction leading edge 20 connects an upstream leading edge 16 and a downstream leading edge 18. The junction portions 19 are configured to detach the reverse air flow F-INV in an auxiliary manner to the thin portions 17. More precisely, the junction portions 19 make it possible to detach the reverse air flow F-INV in gyration following its passage through the fan 3. In fact, the reverse air flow F-INV circulates at the air inlet lip 13 in a direction forming with the longitudinal axis X an angle between 30° and 45°.

In the example in FIG. 6, the junction portions 19 extend over an equal circumferential length so as to act homogeneously and globally on the reverse air flow F-INV. In addition, the junction leading edges 20 preferably comprise an identical shape, the junction leading edges 20 connecting the same upstream leading edge 16, known as "right junction leading edge 20-1" and "left junction leading edge 20-2", being oriented in an opposite direction along a longitudinal symmetry axis. It is specified that the junction leading edge 20 of a junction portion 19 is defined in each radial cross-section of said junction portion 19 by the point of the air inlet lip 13 located furthest upstream. It goes without saying that at least a portion of the junction portions 19 could comprise a different shape and/or size.

Still in the example in FIG. 6, each junction leading edge 20 extends, in projection along a tangential plane PV at the air inlet lip 13, along a detachment axis X20 forming an angle α with respect to the longitudinal axis X between 35° and 70°. The angle α of the right junction leading edges 20-1 is equal and oriented opposite to that of the left junction leading edges 20-2. Advantageously, the reverse air flow F-INV thus flows substantially perpendicularly with respect to the right junction leading edges 20-1, which promotes the detachment of the reverse air flow F-INV. The direction of flow of the reverse air flow F-INV preferably forms an angle with the detachment axis X20 of the right junction leading edges 20-1 between 80° and 100°. It goes without saying that the reverse air flow F-INV could alternately circulate substantially perpendicularly to the left junction leading edges 20-2 instead of the right junction leading edges 20-1.

In reference to FIG. 6, the leading edge 14 of the air inlet lip 13 is thus formed by the assembly of the upstream leading edges 16, junction leading edges 20 and downstream leading edges 18 and is in the form of a wavy closed curve, preferably comprising an assembly of chevrons CH. A chevron CH corresponds to the assembly of an upstream leading edge 16, the two adjacent downstream leading edges 18 and the two junction leading edges 20 joining them. Such a shape is advantageously simple and has two longitudinally separated profiles for the thrust phase A and the reverse thrust phase B.

Figure 7:
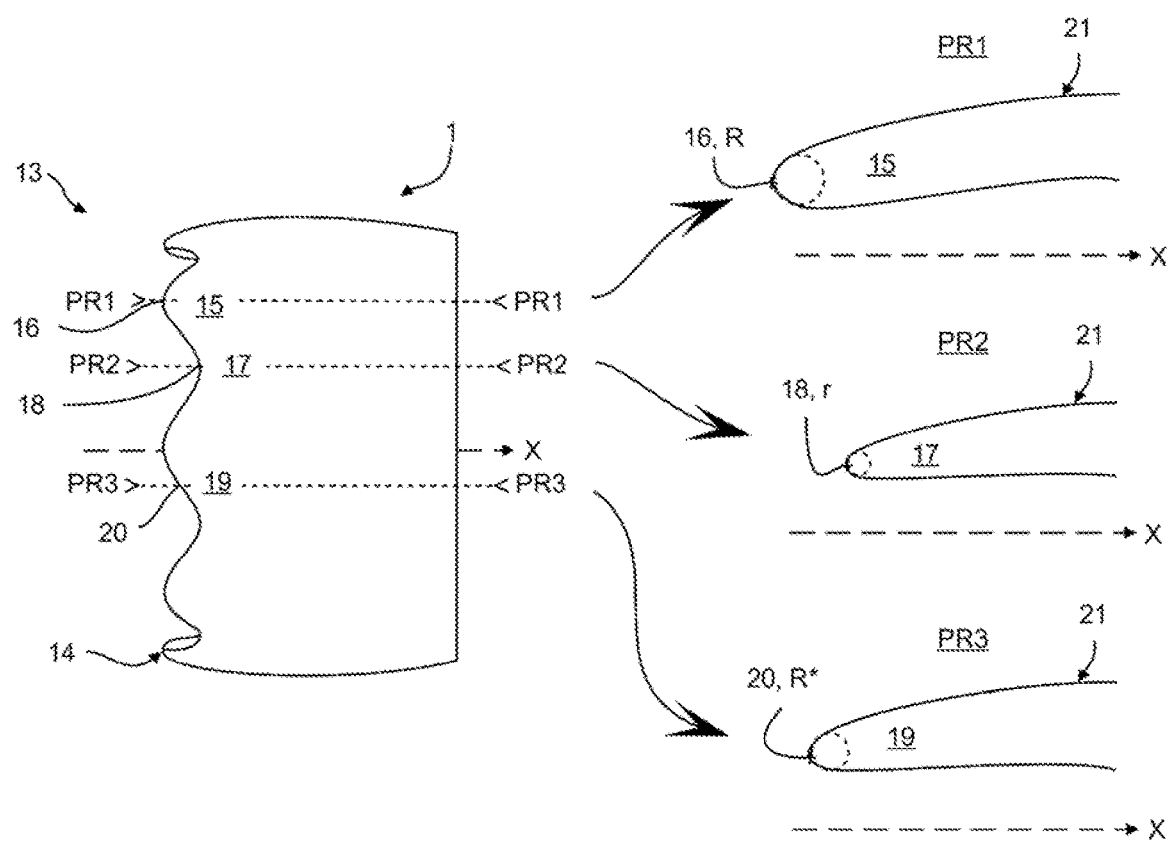
FIG. 7 is a schematic diagram of a radial cross-section of a junction portion, a thin portion, and a thick portion of the air inlet of FIG. 3.

In reference to FIG. 7, the air inlet lip 13 comprises a casing 21 defined in each radial plane by a radius of curvature at the leading edge 14, the radius of curvature varying along the circumference of the air inlet lip 13. More precisely, the casing 21 is defined:

in each radial plane PR1 of a thick portion 15, by a radius of curvature R at the upstream leading edge 16, in each radial plane PR2 of a thin portion 17, by a radius of curvature r at the downstream leading edge 18, and in each radial plane PR3 of a junction portion 19, by a radius of curvature R* at the junction leading edge 20.

As shown in FIG. 7, the radius of curvature R at an upstream leading edge 16 varies over the circumference of the thick portion 15 and is maximal at the upstream point P16. Likewise, the radius of curvature r at a downstream leading edge 18 varies over the circumference of the thin portion 17 and is minimal at the upstream point P18. Preferably, the radii of curvature R, r verify the following relationship R>1.5*r, more preferably R<3*r, and preferably 1.8*r<R<2.2*r. The thickness of a thick portion 15 near the upstream leading edge 16 is thus substantially twice as high as that of a thin portion 17 near the downstream leading edge 18. The radius of curvature R* at a junction leading edge 19 decreases from upstream to downstream, preferably in a linear manner, and verifies the following relationship: r<R*<R. This makes it possible to promote both separation of the upstream air flow F as well as detachment of the reverse air flow F-INV while ensuring aerodynamics and continuity of the air inlet lip 13.

In reference to FIGS. 4 and 5, each thick portion 15 preferably comprises a thickness E greater than the thickness e of a thin portion 17 in the same transverse plane PT3 located downstream of the downstream leading edges 18, and therefore transverse planes PT1, PT2. Each junction portion 19, on the other hand, comprises in the transverse plane PT3 a thickness E* verifying the following relationship: e<E*<E. Preferably, as shown in FIG. 5, each thick portion 15 extends protruding inwardly with respect to the thin portions 17 in the transverse plane PT3. Thus, the thick portions 15 and the thin portions 17 form circulation corridors for the upstream air flow F and the reverse air flow F-INV along the entire air inlet 1. In addition, the air inlet 1 retains an aerodynamic outer shape similar to that of the prior art, only its inner shape being modified.

A method of using the aircraft propulsion assembly 8 according to the invention during a thrust phase A and during a reverse thrust phase B is described in what follows.

In reference to FIG. 2A, during a thrust phase A, during take-off or cruising conditions by way of example, the blades of the variable-pitch fan 3 are oriented so as to allow the air flow to circulate from upstream to downstream. The upstream air flow F circulating from upstream to downstream arrives at the upstream leading edges 16 of the thick portions 15, which separate the upstream air flow F into the outer air flow F-EXT and the inner air flow F-INT. The thick portions 15 advantageously promote the separation of the upstream air flow F and therefore the intake of the inner air flow F-INT to the turbine engine 7 to provide its thrust.

In reference to FIG. 2B, during a reverse thrust phase B, during braking or landing by way of example, the pitch of the blades of the fan 3 is modified to reverse the direction of the secondary air flow F2 in the secondary flow path 5. A reverse air flow F-INV thus circulates from downstream to upstream and passes through the fan 3 where it is driven in gyration. The reverse air flow F-INV then arrives at the downstream leading edges 18 of the thin portions 17 and the junction leading edges 20 of the junction portions 19 which together promote its detachment from the air inlet lip 13. A detaching zone ZD is then formed in contact with the air inlet lip 13, which prevents any local depression detrimental to the reverse thrust B.

Switching from a thrust phase A to a reverse thrust phase B is advantageously simple and quick to implement, requiring only a modification to the orientation of the blades of the fan 3. No step of moving or deforming the air inlet 1 is necessary as in the prior art. The profile of air inlet 1 remains unchanged between the thrust phase A and the reverse thrust phase B.

Figure 8A:
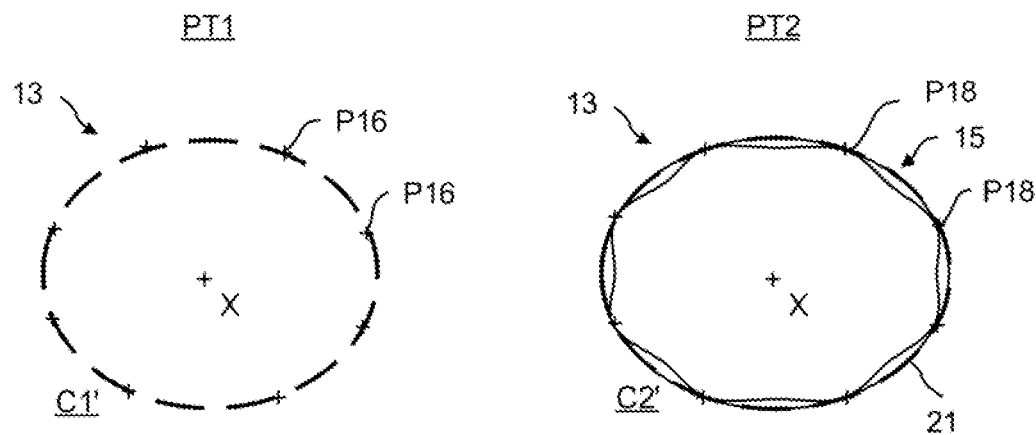
FIG. 8A is a schematic representation according to three cross-sections of the air inlet according to an alternative embodiment of the invention.
Figure 8B:
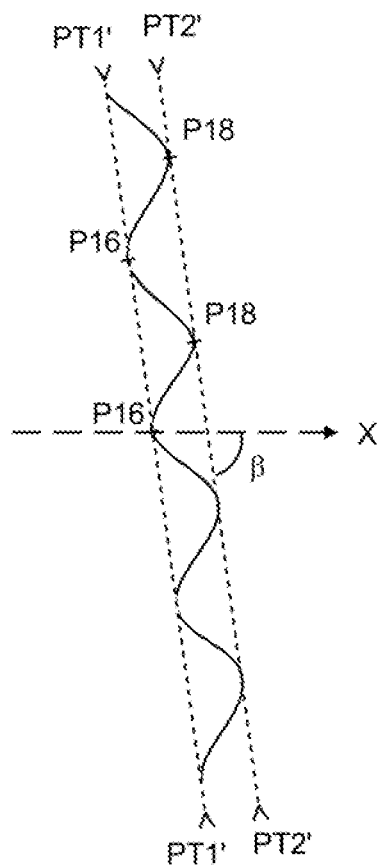
FIG. 8B, FIG. 8C and FIG. 8D are schematic representations in close longitudinal view of the air inlet according to three alternative embodiments of the invention.

FIGS. 8A, 8B, 8C and 8D show alternative embodiments of the invention described previously. In the example of FIG. 8A of a nacelle 2 of elliptical shape of longitudinal axis X, the upstream points P16 of the upstream leading edges 16 belong to an ellipse C1' in the transverse plane PT1 and of center passed through by the longitudinal axis X. Similarly, the upstream points P18 of the downstream leading edges 18 belong to an ellipse C2' in the transverse plane PT2 and of center passed through by the longitudinal axis X. It goes without saying that the upstream points P16 of the upstream leading edges 16 could belong to a closed curve of any shape in the transverse plane PT1, other than the circle C1 of FIG. 5 and ellipse C1' of FIG. 8A, so as to adapt to the shape of nacelle 2 in particular. Idem for upstream points P18 of downstream leading edges 18. It also goes without saying that the closed curve of the upstream points P16 of the upstream leading edges 16 could be different from that of the upstream points P18 of the downstream leading edges 18.

Figure 8C:
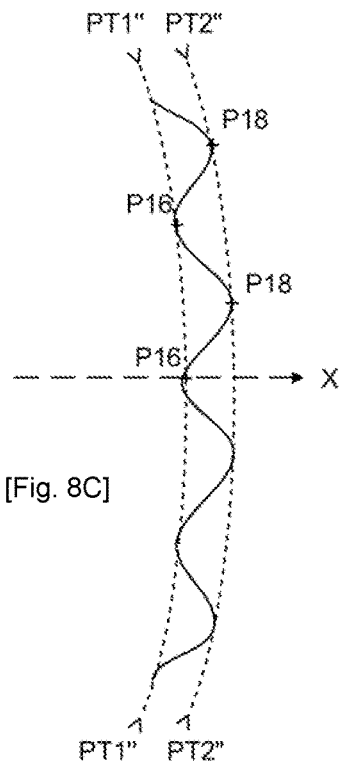
Figure 8D:
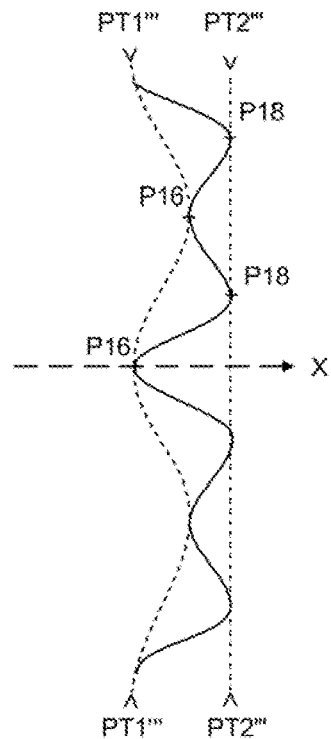

Furthermore, it goes without saying that the upstream points P16 of the upstream leading edges 16 may not be aligned in a transverse plane PT1. Idem for the upstream points P18 of the downstream leading edges P18. In the example in FIG. 8B, the upstream points P16 thus belong to an inclined plane PT1' forming an angle β with respect to the longitudinal axis X in a circumferential plane. The upstream points P18 of the downstream leading edges 18 belong to an inclined plane PT2' parallel to the inclined plane PT1' in this example. FIG. 8C shows another example wherein the upstream points P16, P18 of the upstream 16 and downstream 18 leading edges belong to a curved closed curve PT1", PT2" in a circumferential plane, of concave shape the concavity of which is turned upstream in this example. It also goes without saying that the upstream points P16 of the upstream leading edges 16 could be aligned in a transverse plane PT1 but not the upstream points P18 of the downstream leading edges 18, or inversely as shown in FIG. 8D. In this example, the upstream points P18 of the downstream leading edges 18 are aligned in a transverse plane PT2 but not the upstream points P16 of the upstream leading edges. This makes it possible to obtain chevrons of different lengths.

The invention claimed is:

1. An air inlet of a nacelle of an aircraft propulsion assembly, said aircraft propulsion assembly extending along a longitudinal axis oriented from upstream to downstream and comprising a turbine engine comprising a radially inner primary flow path and a radially outer secondary flow path configured to guide from upstream to downstream, respectively, a primary air flow and a secondary air flow during a thrust phase, said turbine engine comprising upstream a fan rotatably mounted about the longitudinal axis, said aircraft propulsion assembly comprising thrust reverse means configured to modify the secondary air flow into a reverse air flow circulating from downstream to upstream in the secondary flow path during a reverse thrust phase, said nacelle extending outwardly around the turbine engine and comprising at its upstream end the air inlet, said air inlet extending peripherally around the longitudinal axis and comprising an inner wall turned towards the longitudinal axis and an outer wall opposite the inner wall which are connected upstream by an air inlet lip of the air inlet, wherein:

the air inlet lip comprises a thickness defined radially with respect to the longitudinal axis and comprises a plurality of thick portions and a plurality of thin portions distributed alternately over a circumference of the air inlet lip, each of the thick portions comprises an upstream leading edge configured to separate an upstream air flow circulating from upstream to downstream into an outer air flow guided by the outer wall and an inner air flow guided by the inner wall, so as to promote the thrust phase, each of the thin portions comprises a downstream leading edge, located longitudinally downstream from each of the upstream leading edges, configured to detach the reverse air flow at the air inlet lip, so as to promote the reverse thrust phase, wherein the air inlet lip comprises a casing:

defined, in each radial plane of each of the thick portions, by a radius of curvature at the upstream leading edge, defined, in each radial plane of each of the thin portions, by a radius of curvature at the downstream leading edge, wherein the radius of curvature at the upstream leading edge is greater than 1.5 times the radius of curvature at the downstream leading edge.

2. The air inlet according to claim 1, wherein the air inlet lip comprises a plurality of junction portions extending between each of the thick portions and each of the thin portions, each of the junction portions comprising a junction leading edge, so as to detach the reverse air flow in gyration, so as to promote the reverse thrust phase.

3. The air inlet according to claim 2, wherein each of the junction leading edges extends, projected in a tangential plane to the air inlet lip, along a detachment axis forming with the longitudinal axis an angle between 35° and 70°.

4. The air inlet according to claim 1, wherein the air inlet lip comprises a wavy leading edge.

5. The air inlet according to claim 1, wherein the upstream leading edge of each of the thick portions comprises a convex profile extending circumferentially with respect to the longitudinal axis and the convexity of which is turned upstream.

6. The air inlet according to claim 1, wherein the downstream leading edge of each of the thin portions comprises a concave profile extending circumferentially with respect to the longitudinal axis and the concavity of which is turned upstream.

7. The air inlet according to claim 1, wherein, in at least one transverse plane located downstream of the downstream leading edges, each of the thick portions comprises a radial thickness greater than a radial thickness of each of the thin portions.

8. An aircraft propulsion assembly, comprising:
the a turbine engine-of claim 1; and
the a nacelle extending outwardly around the turbine engine;
the nacelle comprising the air inlet of claim 1.

9. A method of using the nacelle air inlet of an claim 1, comprising:
separating the upstream air flow circulating from upstream to downstream into the outer air flow guided by the outer wall and the inner air flow guided by the inner wall during the thrust phase, and
detaching the reverse air flow flowing from downstream to upstream at the air inlet lip during the reverse thrust phase.

10. The air inlet according to claim 4, wherein the wavy leading edge of the air inlet lip comprises a plurality of chevrons.

11. The air inlet according to claim 1, wherein the radius of curvature at the upstream leading edge is less than 3 times the radius of curvature at the downstream leading edge.

12. The air inlet according to claim 7, wherein each of the thick portions extends protruding toward an inside of the air inlet.

13. The air inlet according to claim 1, wherein the fan forms the thrust reverse means.

14. An air inlet of a nacelle of an aircraft propulsion assembly, said aircraft propulsion assembly extending along a longitudinal axis oriented from upstream to downstream and comprising a turbine engine comprising a radially inner primary flow path and a radially outer secondary flow path configured to guide from upstream to downstream, respectively, a primary air flow and a secondary air flow during a thrust phase, said turbine engine comprising upstream a fan rotatably mounted about the longitudinal axis, said aircraft propulsion assembly comprising thrust reverse means configured to modify the secondary air flow into a reverse air flow circulating from downstream to upstream in the secondary flow path during a reverse thrust phase, said nacelle extending outwardly around the turbine engine and comprising at its upstream end the air inlet, said air inlet extending peripherally around the longitudinal axis and comprising an inner wall turned towards the longitudinal axis and an outer wall opposite the inner wall which are connected upstream by an air inlet lip of the air inlet, wherein:

the air inlet lip comprises a thickness defined radially with respect to the longitudinal axis and comprises a plurality of thick portions and a plurality of thin portions distributed alternately over a circumference of the air inlet lip, each of the thick portions comprises an upstream leading edge configured to separate an upstream air flow circulating from upstream to downstream into an outer air flow guided by the outer wall and an inner air flow guided by the inner wall, so as to promote the thrust phase, each of the thin portions comprises a downstream leading edge, located longitudinally downstream from each of the upstream leading edges, configured to detach the reverse air flow at the air inlet lip, so as to promote the reverse thrust phase, wherein the air inlet lip comprises a plurality of junction portions extending between each of the thick portions and each of the thin portions, each of the junction portions comprising a junction leading edge, so as to detach the reverse air flow in gyration, so as to promote the reverse thrust phase, wherein each of the junction leading edges extends, projected in a tangential plane to the air inlet lip, along a detachment axis forming with the longitudinal axis an angle between 35° and 70°.

15. The air inlet according to claim 14, wherein the air inlet lip comprises a wavy leading edge.

16. The air inlet according to claim 14, wherein the upstream leading edge of each of the thick portions comprises a convex profile extending circumferentially with respect to the longitudinal axis and the convexity of which is turned upstream.

17. The air inlet according to claim 14, wherein the downstream leading edge of each of the thin portions comprises a concave profile extending circumferentially with respect to the longitudinal axis and the concavity of which is turned upstream.

18. The air inlet according to claim 14, wherein, in at least one transverse plane located downstream of the downstream leading edges, each of the thick portions comprises a radial thickness greater than a radial thickness of each of the thin portions.

19. An aircraft propulsion assembly, comprising:
the a turbine engine of claim 15; and
the a nacelle extending outwardly around the turbine engine;
the nacelle comprising the air inlet of claim 15.

20. A method of using the nacelle air inlet of claim 14, comprising:
separating the upstream air flow circulating from upstream to downstream into the outer air flow guided by the outer wall and the inner air flow guided by the inner wall during the thrust phase, and
detaching the reverse air flow flowing from downstream to upstream at the air inlet lip during the reverse thrust phase.

* * * * *